United States Patent
Umezu et al.

[11] Patent Number: 5,293,513
[45] Date of Patent: Mar. 8, 1994

[54] SWITCHING SYSTEM FOR AUTOMOTIVE VEHICLE INCLUDING A REFLECTOR POSITIONED BELOW A SIGHT LINE OF A DRIVER

[75] Inventors: Masaharu Umezu; Hiroaki Ideno; Yoshisada Mizutani; Takeshi Inoue, all of Amagasaki, Japan

[73] Assignee: Mitsubishi Denki Kabushiki Kaisha, Tokyo, Japan

[21] Appl. No.: 681,819

[22] Filed: Apr. 8, 1991

[30] Foreign Application Priority Data

May 30, 1990 [JP] Japan .................................. 2-142210

[51] Int. Cl.⁵ .............................................. B60Q 1/00
[52] U.S. Cl. ..................................... 307/10.1; 307/112
[58] Field of Search ................... 307/9.1, 10.1, 112, 307/125, 139; 340/945, 933, 971, 972

[56] References Cited

U.S. PATENT DOCUMENTS

| | | | |
|---|---|---|---|
| 3,737,212 | 6/1973 | Antonson et al. | 350/174 |
| 4,352,401 | 10/1982 | Vitaloni | 307/10.1 |
| 4,578,592 | 3/1986 | Nakazawa et al. | 307/10.1 |
| 4,792,783 | 12/1988 | Burgess et al. | 340/22 |
| 4,859,031 | 8/1989 | Berman et al. | 350/174 |
| 4,900,133 | 2/1990 | Berman | 350/436 |
| 4,996,442 | 2/1992 | Wayne | 307/10.1 |

FOREIGN PATENT DOCUMENTS

| | | |
|---|---|---|
| 0371873 | 6/1990 | European Pat. Off. . |
| 0005436 | 11/1981 | Fed. Rep. of Germany . |
| 3628333 | 3/1988 | Fed. Rep. of Germany ...... DEX/1 |
| 57-182540 | 11/1982 | Japan . |
| 58-22732 | 2/1983 | Japan . |
| 190031 | 12/1984 | Japan . |
| 59-227531 | 12/1984 | Japan . |

Primary Examiner—Jeffrey A. Gaffin
Attorney, Agent, or Firm—Sughrue, Mion, Zinn, Macpeak and Seas

[57] ABSTRACT

A switch system for an automotive vehicle enables the driver to properly operate various devices mounted on the vehicle without reducing or limiting the driver's field of view to any practical extent. In one form, the switch system includes a plurality of switches for operating various devices mounted on the vehicle; a switch selection detector for detecting which one of the switches is selected by a driver; a display for displaying the result of a driver's switch selection detected by the switch selection detector as well as the operating conditions of the devices as a result of the driver's switch selection; and a reflector in the form of a half mirror provided at a location above a dash board for reflecting the contents of the display so that the driver can watch the displayed contents of the display as reflected on the reflector. In another form, the reflector is omitted and the display is provided at a location above a dash board and below the driver's sight line through a front windshield so as not to reduce the driver's forward viewing field through the windshield so that the driver can watch the displayed contents of the display while watching the road ahead.

10 Claims, 12 Drawing Sheets

SWITCHING SYSTEM FOR AUTOMOTIVE VEHICLE INCLUDING A REFLECTOR POSITIONED BELOW A SIGHT LINE OF A DRIVER

BACKGROUND OF THE INVENTION

The present invention relates to a switch system for an automotive vehicle which is used for controlling, from a driver's compartment, various pieces of equipment such as a radio, an air conditioner, a road-condition and traffic-information displaying device mounted on the vehicle.

Japanese Patent Laid-Open No. 59-67516 discloses a typical example of such a switch system for an automotive vehicle as illustrated in FIG. 18. The vehicle illustrated includes a steering wheel 102 mounted on the top of a steering column 144 for operation by a driver 101, an instrument panel 103, an instrument panel hood 107, and a front windshield 108. A switch means 139 is installed on the steering column 144. A driver's sight line through the front windshield 108 and another driver's sight line directed to the instrument panel 103 are designated by reference numerals 109 and 140, respectively.

FIG. 19 shows one example of a display pattern 141 on the instrument panel 103 which includes four functions of television (TV), navigation (NAVI), audio (AUDIO) and air conditioning (A/C) designated by 0 through 3, respectively, with the function 1 of navigation "NAVI" being now selected.

FIG. 20 shows an example of the switch means 139 which has a pair of side switch columns 145, 146 mounted on opposite sides of the steering columns 144 and extending therefrom in a horizontal manner, a pair of rotary switches 142, 143 mounted on the ends of the side switch columns 145, 146, respectively, and a pair of set switches 147, 148 provided on the heads or tops of the rotary switches 142, 143, respectively.

In operation, the functions of the set switches 147, 148 are indicated by the display pattern 141 and can be selected by the driver 101 by rotating the rotary switches 142, 143. By pushing one of the set switches 147, 148 with a desired function selected by a corresponding one of the rotary switches 142, 143, a switching operation for performing the selected function in done. For example, if the driver 101 depresses one of the set switches 147, 148 with a particular display condition of the instrument panel 103 (e.g., "NAVI" selected as illustrated in FIG. 19), the corresponding function or device (e.g., an unillustrated navigator) is turned on. In this manner, using the above-described switch system, the driver 101 is able to control various pieces of equipment provided in the vehicle by only slightly shifting his or her sight line from the outward line of sight 109 suitable for looking at the road or objects ahead of the vehicle through the front windshield 108 into the inward line of sight 140 directed toward the instrument panel 103 while continuously watching the road condition ahead of the vehicle to some extent. This serves for improved safety in driving.

With the above-mentioned automotive switch system, however, the functions carried out by depressing the set switch 147, 148 is displayed inside the instrument panel 103 so that the driver 101 has to shift his or her sight line to the instrument panel 103 to some extent in order to ascertain the functions to be performed in accordance with the setting of the set switches 147, 148. This results in an appreciable deviation from the outwardly directed line of sight 109 through the front windshield 108 necessary for safe driving, thus reducing or limiting the driver's field of forward view to some extent.

SUMMARY OF THE INVENTION

The present invention is intended to obviate the abovedescribed problems encountered with the conventional switch system.

An object of the present invention is to provide a switch system for an automotive vehicle which enables the driver to properly operate various devices mounted on the vehicle without reducing or limiting the driver's field of view to any practical extent.

In order to achieve the above object, according to one aspect of the invention, there is provided a switch system for an automotive vehicle comprising:

a plurality of switches for operating various devices mounted on the vehicle;

a switch selection detector for detecting which one of the switches is selected by a driver;

display means for displaying the result of a driver's switch selection detected by the switch selection detector as well as the operating conditions of the devices as a result of the driver's switch selection; and a reflector provided at a location above a dash board for reflecting the contents of the display means so that the driver can watch the displayed contents of the display means as reflected on the reflector while watching the road ahead.

In one embodiment, the reflector comprises a half mirror.

In another embodiment, the reflector comprises a front windshield.

According to another aspect of the invention, there is provided a switch system for an automotive vehicle comprising:

a plurality of switches for operating various devices mounted on the vehicle;

a switch selection detector for detecting which one of the switches is selected by a driver; and display means for displaying the result of a driver's switch selection detected by the switch selection detector as well as the operating conditions of the devices as a result of the driver's switch selection, the display means being provided at a location above a dash board and below the driver's sight line through a front windshield so as not to reduce the driver's field of forward view through the windshield, so that the driver can watch the displayed contents of the display means while watching the road ahead.

In one preferred form, the switches and the switch selection detector are mounted on a steering wheel.

In one preferred form, the switches and the switch selection detector are mounted on the devices.

The above and other objects, features and advantages of the present invention will become more readily apparent from the following detailed description of several preferred embodiments of the invention taken in conjunction with the accompanying drawings.

BRIEF DESCRIPTION OF THE DRAWINGS

In the drawings, the same or corresponding elements are identified by the same symbols.

DESCRIPTION OF THE PREFERRED EMBODIMENTS

Several preferred embodiments of the present invention will now be described in detail while referring to the accompanying drawings.

Figure 1:
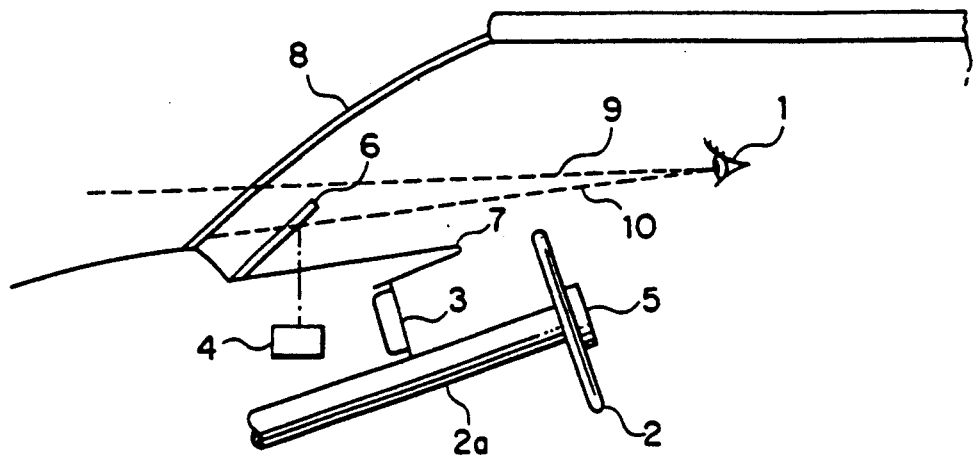
FIG. 1 is a schematic view showing the general arrangement of a switch system for an automotive vehicle in accordance with a first embodiment of the present invention.

Referring to the drawings, FIG. 1 shows the general arrangement of a switch system for an automotive vehicle constructed in accordance with a first embodiment of the invention. The automotive vehicle illustrated includes a steering wheel 2 mounted on the top of a steering column 2a so as to be operated by a driver 1, an instrument panel 3, an instrument panel hood 7 disposed atop the instrument panel 3, and a front windshield 8 through which the driver 1 can watch the road ahead of the vehicle on which it is travelling. The switch system of this embodiment includes a display means 4 such as a liquid crystal display, a fluorescent display, etc., a switch unit 5 mounted on the steering wheel 2, and a reflector 6 in the form of a half mirror mounted on a dash board for reflecting the contents of the display means 4, and a control unit 13 (see FIG. 2) for controlling the display means 4 and various devices (not shown) mounted on the vehicle on the basis of information input from the switch unit 5. As clearly shown in FIG. 1, a driver's forward sight line 9 through the front windshield 8 and a driver's display-viewing sight line 10 directed to the display means 4 are oriented substantially in the same direction.

Figure 2:
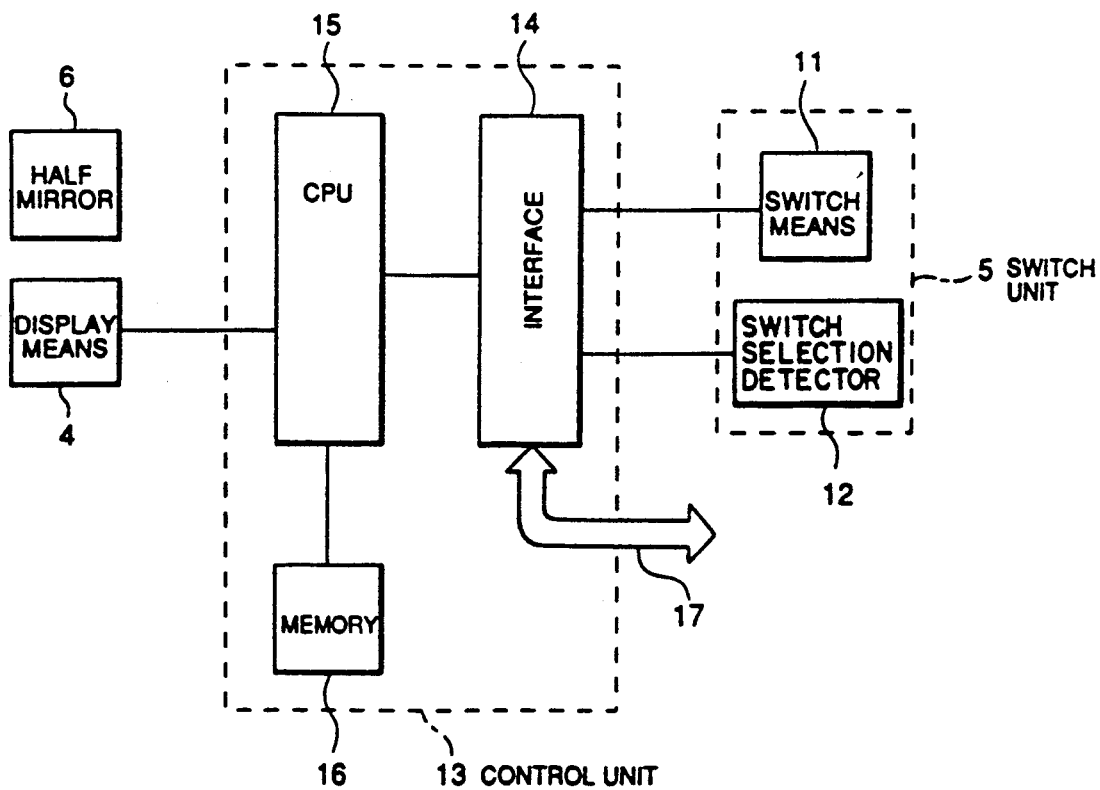
FIG. 2 is a block diagram of the switch system of FIG. 1.

As diagrammatically illustrated in FIG. 2, the switch unit 5 comprises a manipulative switch means 11 and a switch selection detector 12. The control unit 13 includes an interface 14 which is connected to the manipulative switch means 11, the switch selection detector 12 and to unillustrated vehicle-mounted devices via a control/status line 17 in the form of a bus, a central processing unit (CPU) 15, and a memory 16 for storing information, data, programs executed by the CPU 15, etc. Also, the control unit 13 reads out the present statuses or operating conditions of the vehicle-mounted devices through the control/status line 17, and controls the display means 4 based thereon.

Figure 3:
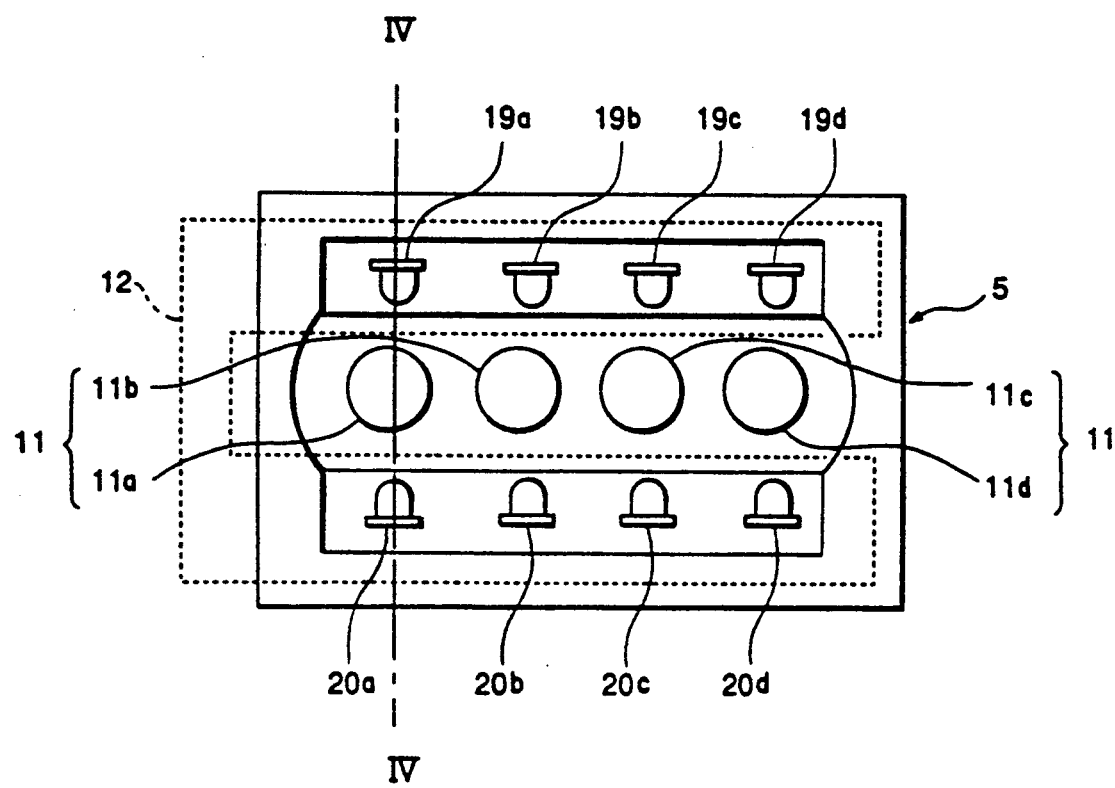
FIG. 3 is a front elevational view of a switch means of the switch system of FIG. 1.
Figure 4:
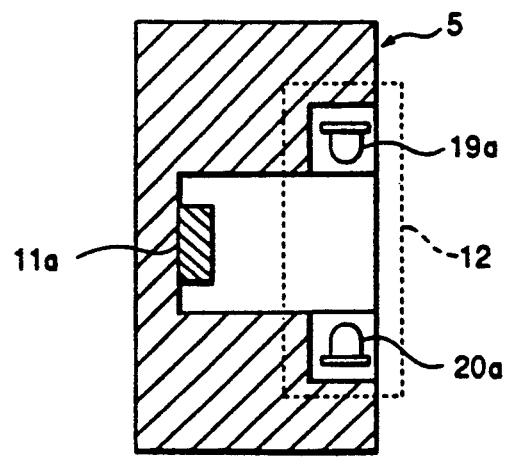
FIG. 4 is a vertical sectional view taken on line IV—IV of FIG. 3.

FIGS. 3 and 4 show the detailed construction of one example of the switch unit 5. The manipulative switch means 11 includes a plurality (e.g., four in the illustrated example) of switches 11a–11d, and the switch selection detector 12 includes a plurality of pairs of infrared LEDs 19a–19d and phototransistors 20a–20d which are disposed in pair on the opposite sides of the corresponding switches 11a–11d in alignment with each other. The infrared LEDs 19a–19d emit infrared rays toward the corresponding phototransistors 20a–20d. The phototransistors 20a–20d detect infrared rays from the corresponding infrared LEDs 19a–19d for determining which one of the switches 11a–11d is selected by the driver 1. Specifically, in the illustrated example, the switches 11a–11d are of a push-button type so that when the driver 1 pushes down the switch 11a for example, one of his or her fingers pushing the switch 11a interrupts infrared rays from the corresponding infrared LED 19a. As a result, the corresponding phototransistor 20a fails to receive the infrared rays from the infrared LED 19a, thus detecting that the driver 1 has selected the switch 11a.

Figure 5:
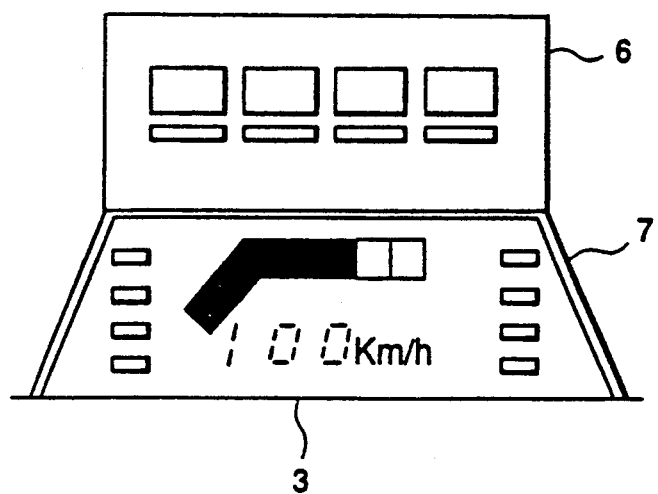
FIG. 5 is an explanatory view showing a field of forward view through a front windshield.
Figure 6:
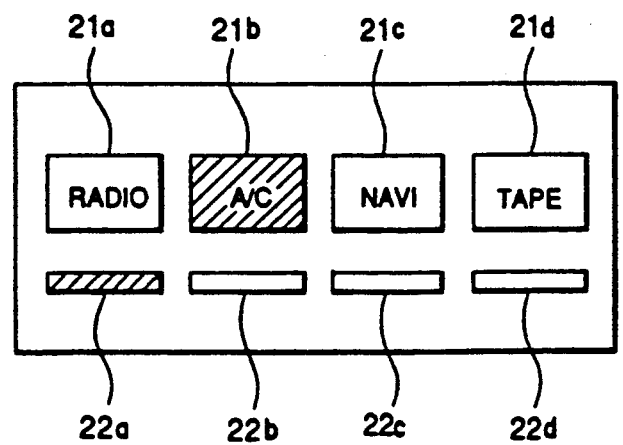
FIG. 6 is an explanatory view showing a first operating condition of the switch means of FIG. 3.

FIG. 5 shows the driver's field of view in accordance with this first embodiment in which a pattern, corresponding to that shown in FIG. 6, indicative of a function selected by the driver 1 is displayed on the half mirror 6 which is mounted on the dash board or instrument panel hood 7 and extends therefrom obliquely.

Figure 7:
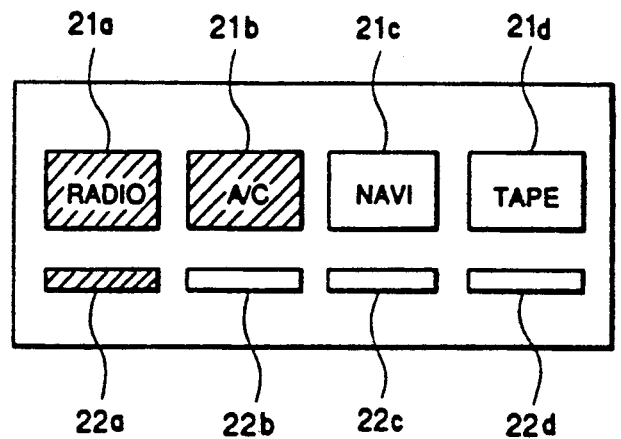
FIG. 7 is an explanatory view showing a second operating condition of the switch means of FIG. 3.
Figure 8:
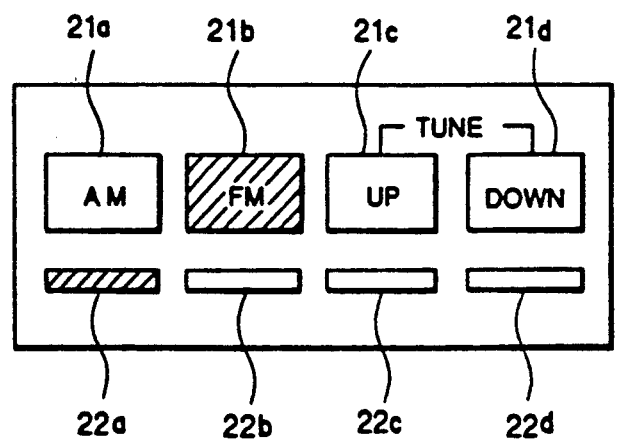
FIG. 8 is an explanatory view showing a third operating condition of the switch means of FIG. 3.

FIGS. 6 through 8 show some examples of patterns displayed on the display means 4. The patterns to be displayed include a set of device-operating-condition indicating patterns 21 and a set of corresponding switch-selection indicating patterns 22. The arrangement or layout of the switch-selection indicating patterns 22 corresponds to that of the manipulative switch means 11 on the steering wheel 2. For example, the device-operating-condition indicating patterns 21 include a radio-operating-condition indicting pattern 21a, an air-conditioner-operating-condition indicating patterns 21b, a navigator-operating-condition indicating pattern 21d. When the driver 1 is manipulating the switch 11a for example, the pair of corresponding infrared LED 19a and phototransistor 20a cooperate to detect the selection of the switch 11a by the driver 1, as described above. Based on this detection, the corresponding switch-selection indicating pattern 22a is turned on, as illustrated in FIG. 6. Subsequently, when the switch 11a has been pushed down by the driver 1, the corresponding radio-operating-condition indicating pattern 21a is then turned on, as shown in FIG. 7. Thereafter, the device-operating-condition indicating patterns 21a-21d are changed into new display patterns 21a-21d related to the operation of the thus selected radio for further selection by the driver 1.

Figure 9:
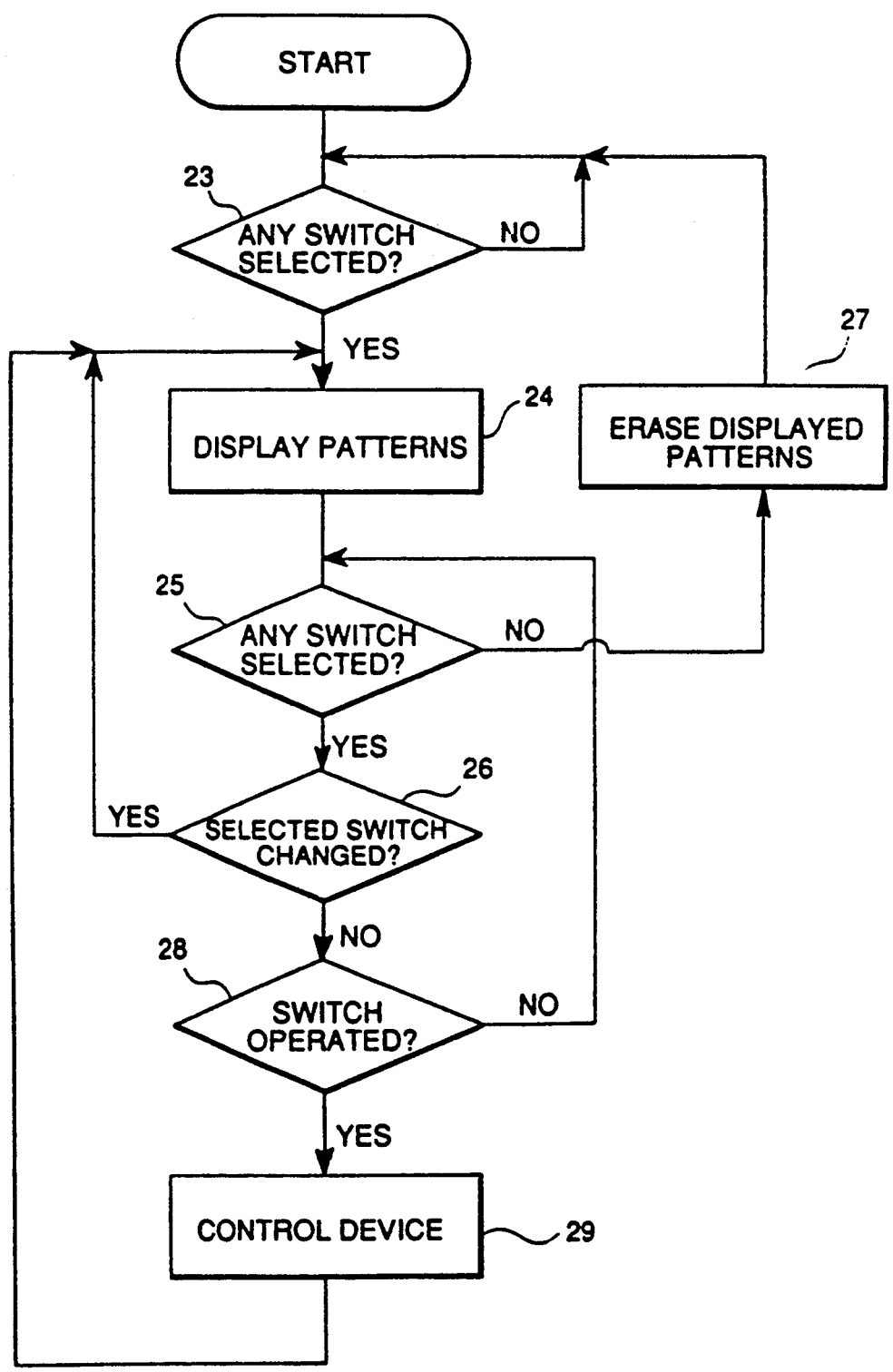
FIG. 9 is a flow chart showing a basic operation of the switch system of the first embodiment.

Now, the basic operation of the above embodiment will be described in detail while referring to the flow chart of FIG. 9. First in Step 23, based on the result of detection of the switch selection detector 12, it is determined whether any of the switches 11a-11d is selected by the driver 1. If not, Step 23 is repeated. If the answer is "YES", a corresponding switch-selection indicating pattern 22a for example is displayed on the display means 4 and reflected on the half mirror 7 in Step 24, as depicted in FIG. 6. In this state, the reflected patterns on the half mirror 7 indicate that the air conditioner is already on and the radio has now been selected. Subsequently, in Step 25, it is once again determined whether any of the switches 11a-11d is selected. If the answer is "NO", the program goes to Step 27 where it is determined that the driver 1 stopped the switch manipulation, and hence the presently displayed patterns 21a, 22a are erased or turned off. Thereafter, the program returns to Step 23. In this connection, the erasure of the display can be effected after the lapse of a predetermined time. On the other hand, if the answer is "YES" in Step 25, the program goes to Step 26 where it is determined whether there is a change between the present selection of a switch and the last selection. If the answer is "YES", the program returns to Step 24 for updating the display means 4 in correspondence with the changed switch selection. Looking at the thus updated display patterns reflected by the half mirror 6, the driver 1 can ascertain or change the switch selection. On the other hand, if there is no change in the switch selection in Step 26, the program goes to Step 28 where it is further determined whether any switch is operated by the driver 1. If the answer is "NO", the program returns to Step 25. If, however, the answer is "YES", the program goes to Step 29 where the control unit 13 controls a corresponding device mounted on the vehicle in accordance with the driver's switch manipulation, and thereafter the program returns to Steps 24 where the control unit 13 accordingly controls the display means 4 so as to display an appropriate indication of the result of such control. FIG. 7 shows such a situation in which the display means 4 indicates that the radio is now turned on as a result of the driver's switch operation.

Figure 10:
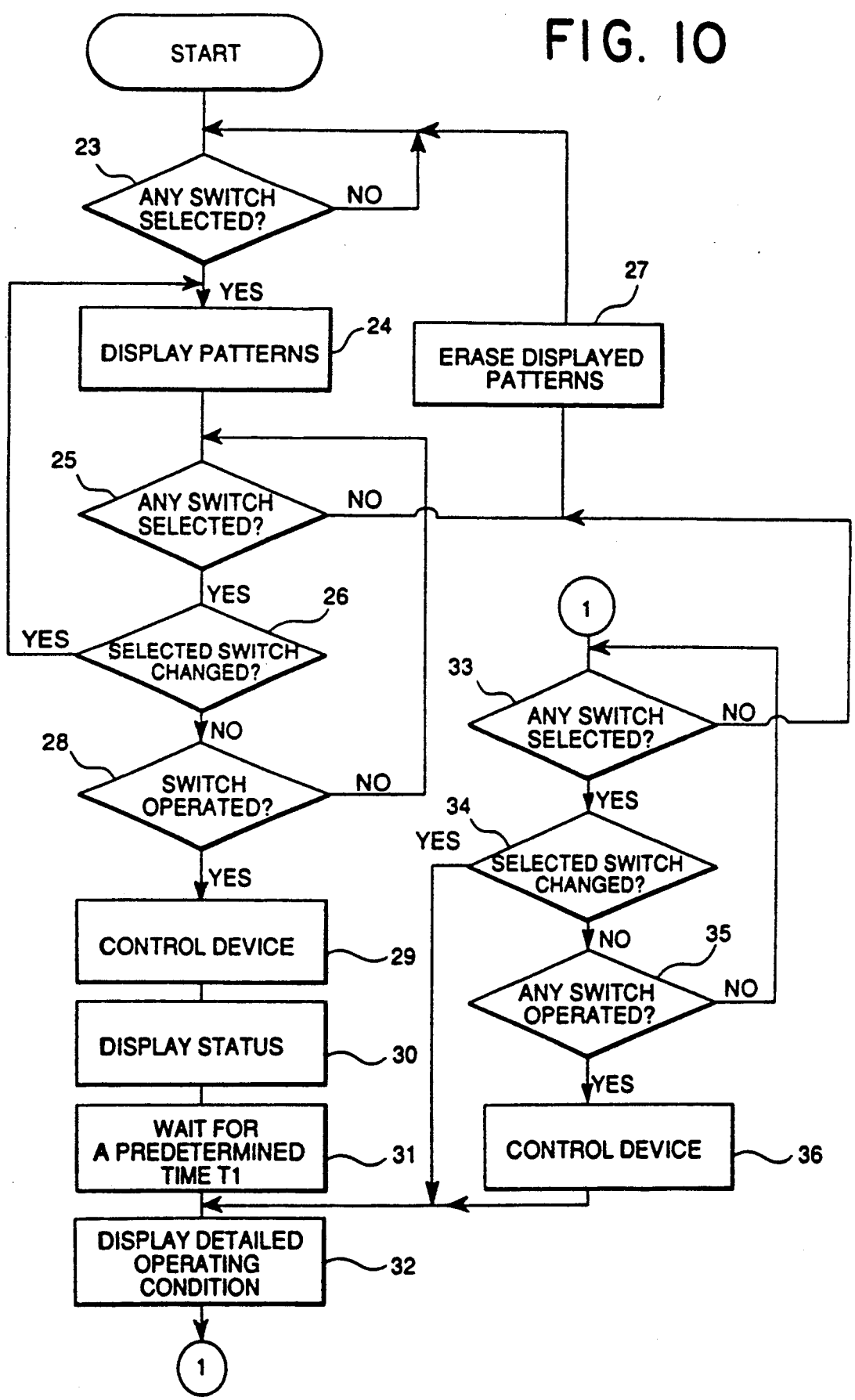
FIG. 10 is a flow chart showing a more complicated operation of the switch system of the first embodiment.

Although the above-described operation is a basic one such as for performing the on-off control of a vehicle-mounted device, a finer or more complicated operation can be done by the above embodiment. Such an operation will now be described in detail with particular reference to FIG. 10 as well as FIGS. 7 and 8. In FIG. 10, Steps 23 through 29 are the same as those in FIG. 9, and hence a detailed description thereof is omitted. After the vehicle-mounted device (i.e., the radio in the illustrated example) is controlled by the control unit 13 in Step 29, the present statuses of the vehicle-mounted device including the radio is displayed as appropriate patterns on the display means 4 in Step 30. FIG. 7 shows one example of such display patterns. Then in Step 31, waiting is performed for a predetermined time T1 in order to allow the driver 1 to visually recognize the patterns displayed in Step 30. After the lapse of a predetermined time T1, further detailed operating conditions related to the selected device are displayed on the display means 4 in Step 32. FIG. 8 shows an example of such detailed operating conditions in the form of radio operation details as displayed in which a band selection switch for the AM band has now been operated with the radio being tuned to the FM band. The following Steps 33, 34 and 35 are similar to Steps 25, 26 and 28, respectively. First in Step 33, it is determined whether ny of the switches 11a-11d is selected by the driver 1. If no switch is selected, the contents on the display means 4 are erased in Step 27 and then the program returns to Step 23. If some switch is selected in Step 33, it is then determined in Step 34 whether the switch now selected is different form the one last selected. If the answer is YES", the program returns to Step 32 for updating the detailed contents of the display means 4 so as to reflect the changed switch selection. If, however, there is no change in the switch selection, it is further determined in Step 35 whether there is any switch selection subsequently performed. If the answer is "NO", the program returns to Step 33, whereas if the answer is "YES", the program goes to Step 36 where the control unit 13 controls the vehicle-mounted device in accordance with the driver's switch operation. Thereafter, the program returns to Step 32 for displaying the detailed operating conditions representative of the result of such control.

As described in the foregoing, according to the first embodiment, the contents of the display means 4 is reflected on the half mirror 6 located above the dash board or instrument panel hood 7 so that the driver's sight line 9 for looking through the front windshield 8 at the road ahead of the vehicle and the driver's sight line 10 for watching the contents of the display 4 become substantially the same direction, enabling the driver 1 to ascertain the result of a switch operation as well as the condition of switch selection while continuously watching a forward view through the front windshield 8. In this embodiment, however, the use of the half mirror 6 result sin an increased cost of manufacture.

Figure 11:
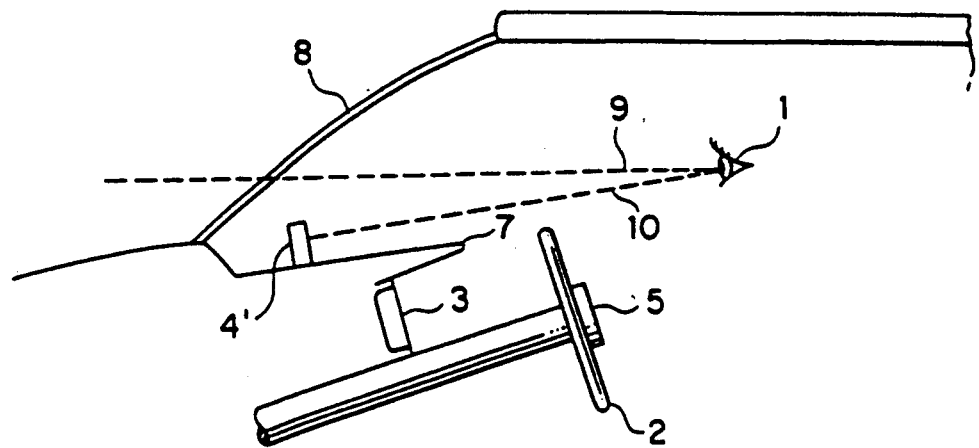
FIG. 11 is a view similar to FIG. 1; but showing an automotive switch system in accordance with a second embodiment of the invention.

FIG. 11 shows a second embodiment of the invention which can be manufactured at lower costs than the first embodiment. In this second embodiment, a display means 4' is provided on or above a dash board or an instrument panel hood 7 at a location slightly below the driver's field of forward view through the front windshield 8, i.e., just below the driver's normal or lowermost sight line 9 directed to the outside through the windshield 8, so that the driver 1 can directly see the contents of the display means 4' above the instrument panel hood 7. In this case, the driver's sight line 10 directed toward the display means 4' is substantially the same as that directed toward the half mirror 6 of FIG. 1.

Figure 12:
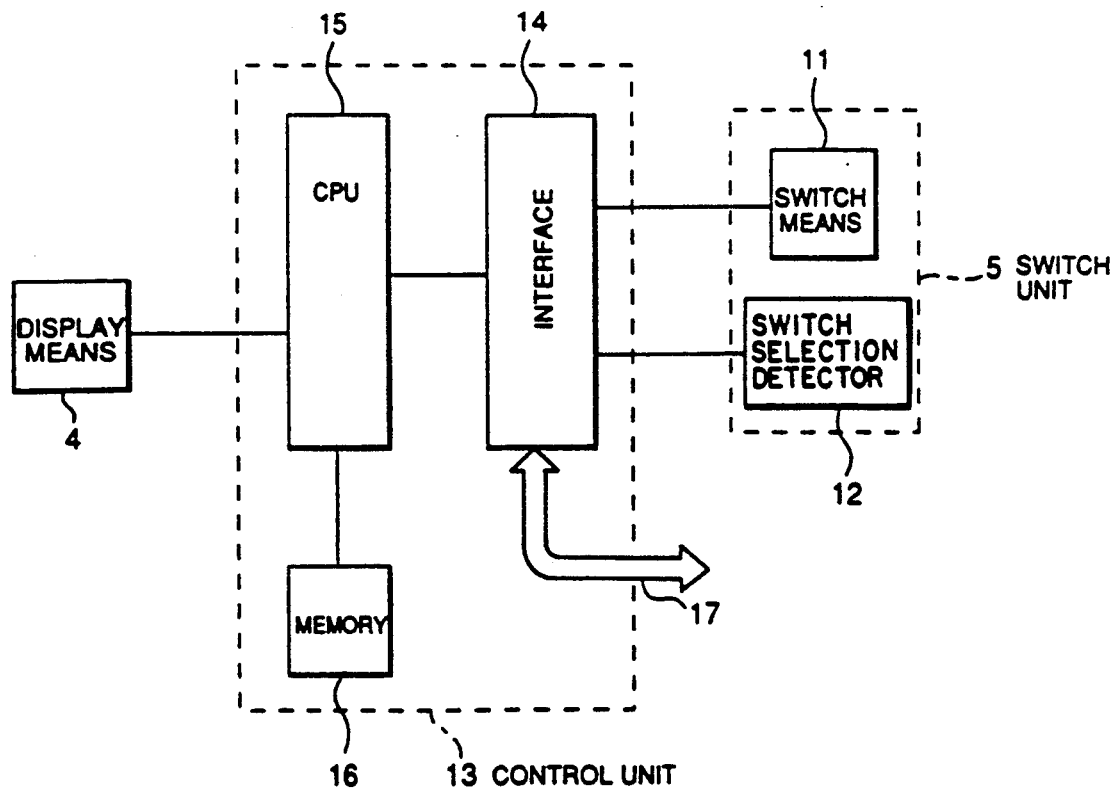
FIG. 12 is a view similar to FIG. 2, but showing the second embodiment of the invention.

FIG. 12 shows, in a block form, the schematic construction of the second embodiment which is substantially the same as that of the first embodiment of FIG. 2 except for the half mirror 6 being omitted.

Figure 13:
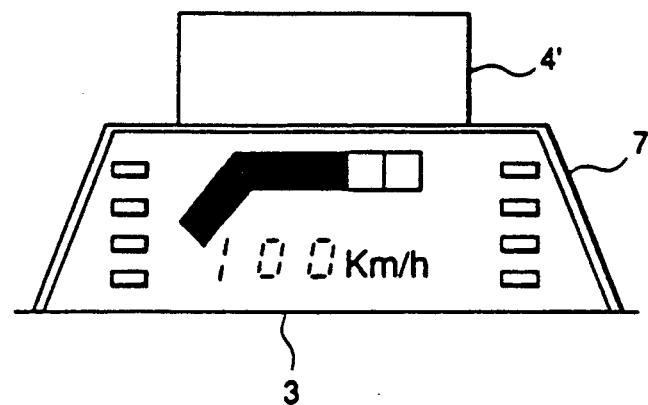
FIG. 13 is a view similar to FIG. 5, but showing the second embodiment the invention.

FIG. 13 illustrates the driver's normal field of forward view as obtained with the second embodiment, in which patterns are displayed on the display means 4' above the instrument panel hood 7.

The operation of the second embodiment is substantially similar to that of the first embodiment excepting that the various operating conditions and statuses of unillustrated vehicle-mounted devices and the switch means 11a-11d are directly displayed as corresponding patterns on the display means 4'. Like the first embodiment, since in the second embodiment the driver's forward sight line directed through the front windshield 8 and the driver's sight line watching the contents of the display 4' become substantially the same direction, the driver can make sure of the result of his or her switch operation as well as the condition of his or her switch selection without shifting his or her lien of sight to any appreciable extent.

Figure 14:
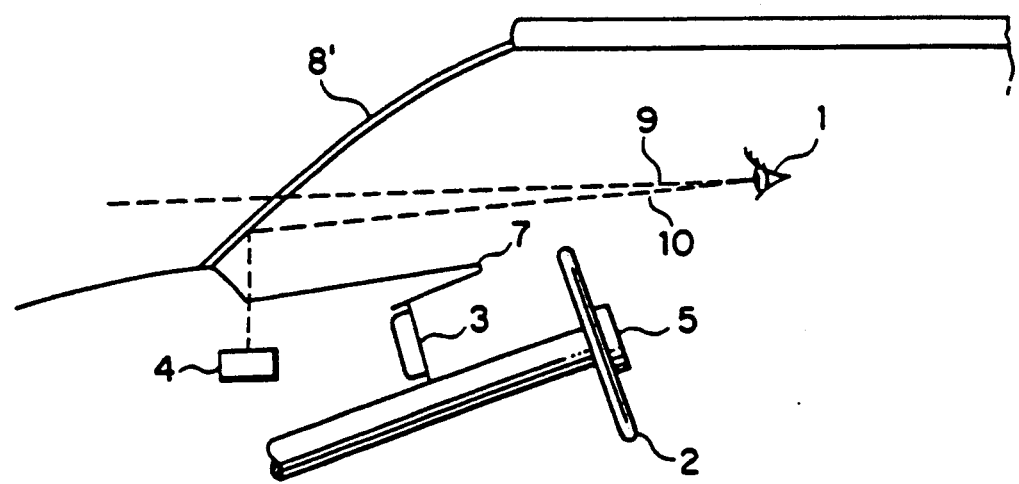
FIG. 14 is a view similar to FIG. 1, but showing an automotive switch system in accordance with a third embodiment of the invention.

Although in the first embodiment, the half mirror 6 located above the instrument panel hood 7 is used, a front windshield 8' can be utilized as a half mirror for reflecting the contents of a display means 4 located below an instrument panel hood 7, as illustrated in FIG. 14.

Figure 15:
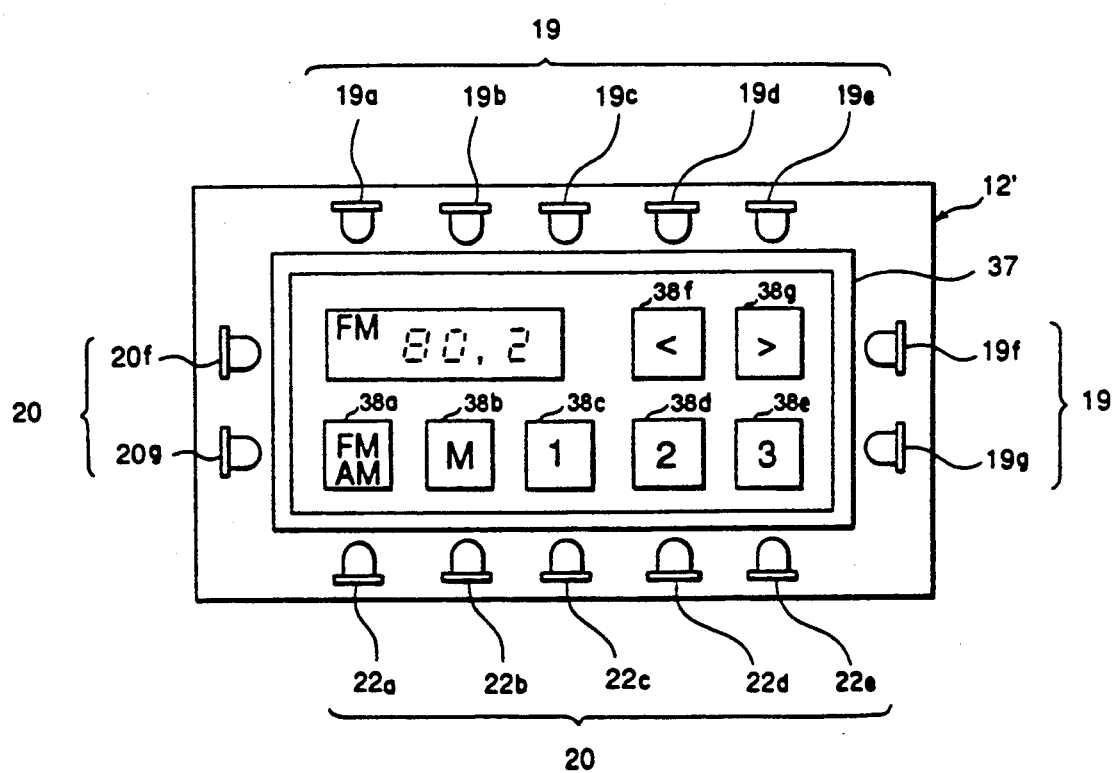
FIG. 15 is a view similar to FIG. 3, but showing a further embodiment of the invention.

Further, in the above-described embodiments, the switch unit 5 includes the manipulative switch means 11 and the switch selection detector 12 both provided on the steering wheel 2, but the switch selection detector 12 may be installed on manipulative or control switches for vehicle-mounted devices. For example, it can be installed on manipulative switches which are mounted on a surface of a radio, an air conditioner and the like, on power window control switches, on control switches for remote-controlled rear view mirrors, etc. FIG. 15 shows such an embodiment in which a switch selection detector 12' is mounted on a radio 37 for detecting the selection of a radio manipulative switch 38 by the driver, and the status such as the operating condition of the radio 37 (e.g., the radio 37 is tuned to 80.2 MHZ in the FM band) is displayed at the display means 4' of FIG. 11 or at the half mirror 6 of FIG. 1 or at the front windshield 8' of FIG. 14.

Figure 16:
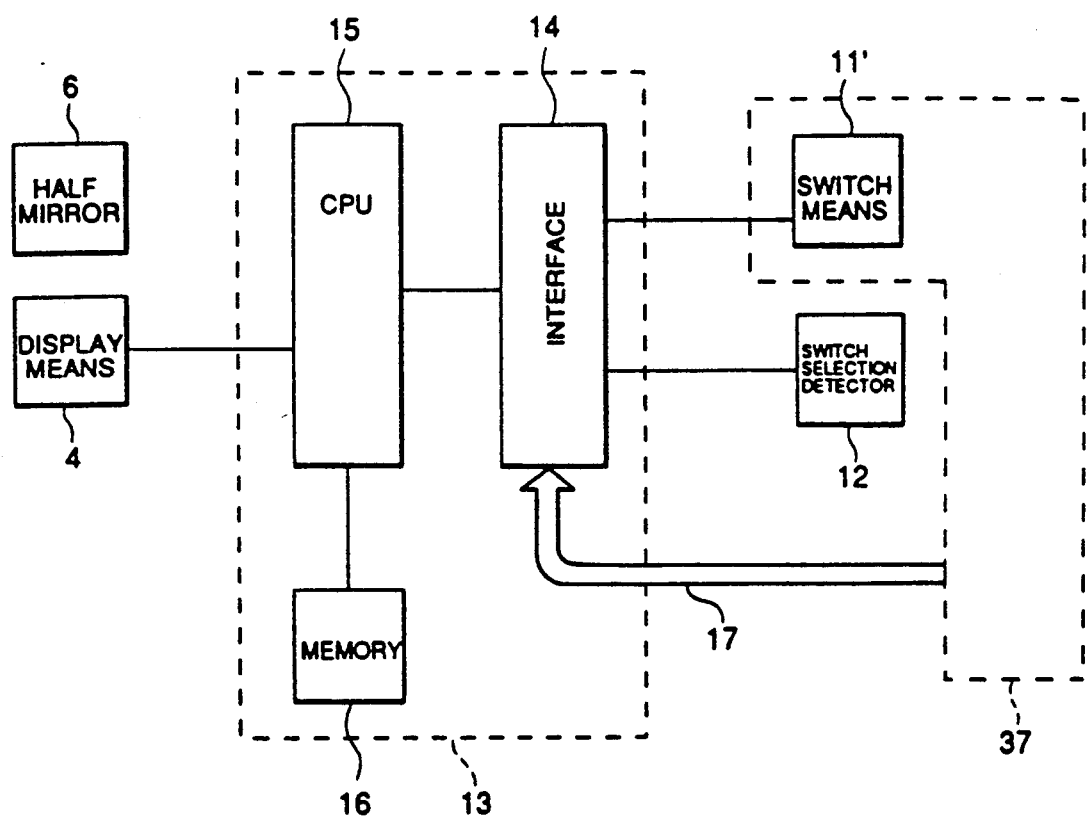
FIG. 16 is a view similar to FIG. 2, but showing a further embodiment of the invention.

FIG. 16 shows, in a block form, a schematic construction of a switch system as constructed by applying the principles of FIG. 15 to the first embodiment of FIG. 1. In this case, a switch means 11' is incorporated in a vehicle-mounted device in the form of a radio 37. The remaining construction of this FIG. 16 embodiment is similar to that of FIG. 2.

Figure 17:
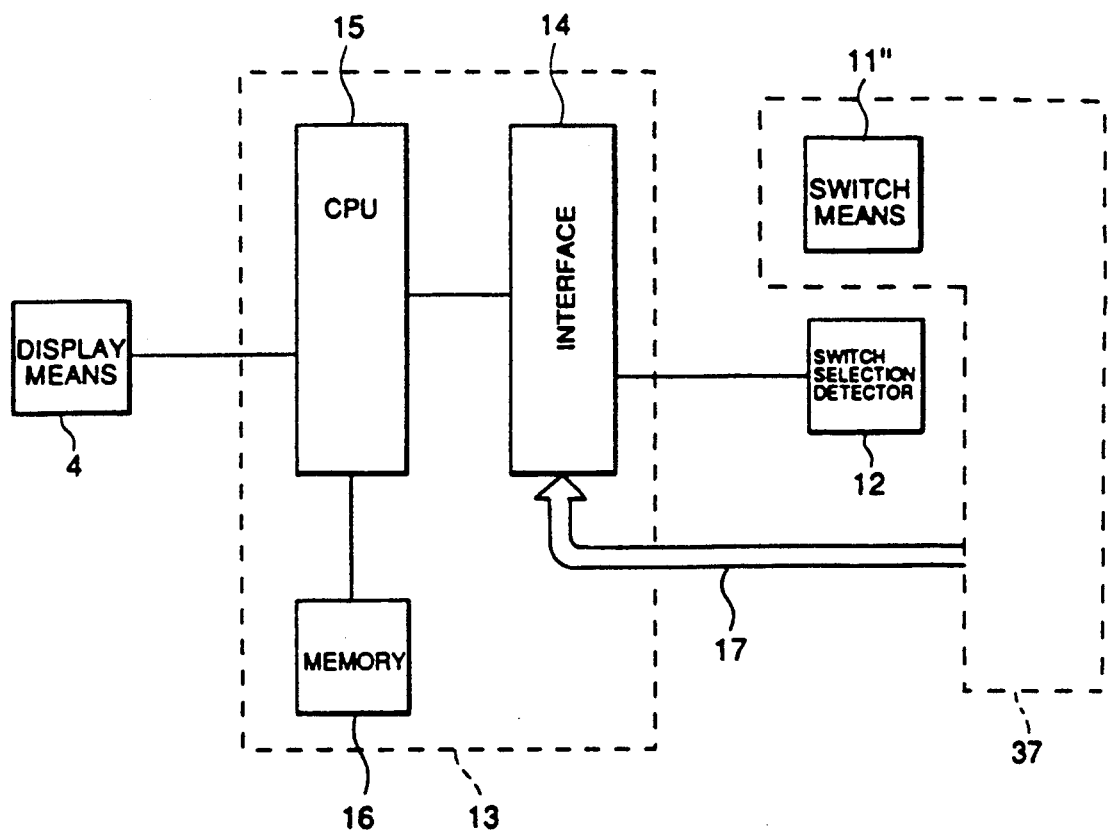
FIG. 17 is a view similar of FIG. 2, but showing a further embodiment of the invention.
Figure 18:
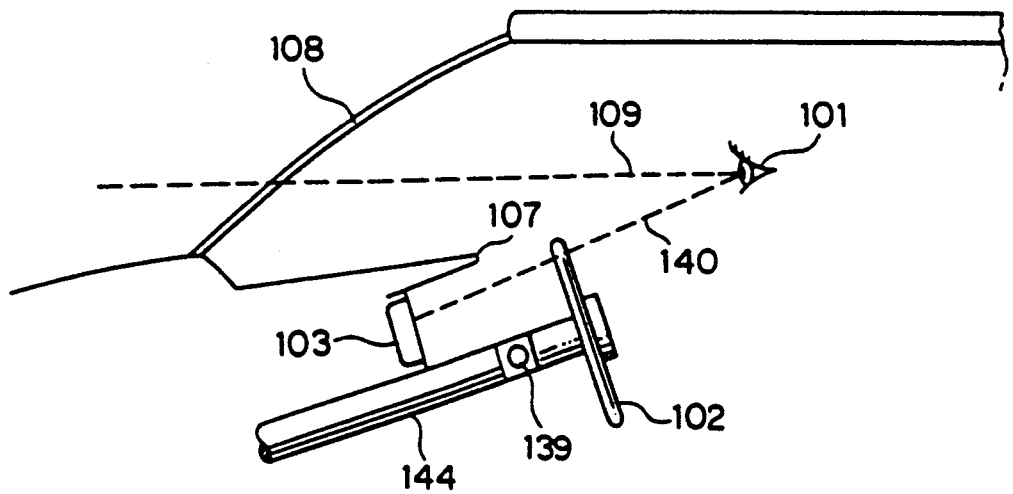
FIG. 18 is a view similar to FIG. 1, but showing a conventional automotive switch system.
Figure 19:
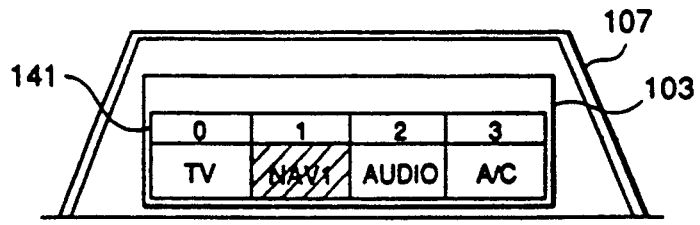
FIG. 19 is an explanatory view showing an example of a display pattern of the conventional switch system of FIG. 18.
Figure 20:
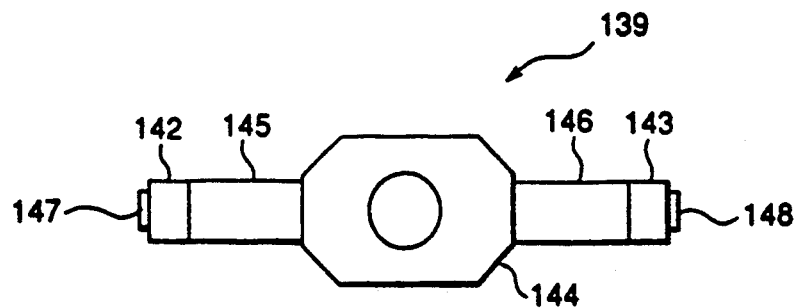
FIG. 20 is a view showing the construction of switches of the conventional switch system.

FIG. 17 shows, in a block form, another embodiment of a switch system as constructed by applying the principles of the FIG. 15 to the second embodiment. In this case, a switch means 11'' is incorporated in a vehicle-mounted device in the form of a radio 37. The remaining construction of this FIG. 17 embodiment is similar to that of FIG. 12.

Moreover, although in the above embodiments, the switch means 11, 11', 11'', the patterns 21 indicative of the operating conditions of vehicle-mounted devices, and patterns 22 indicative of the condition of the driver's switch selection are laid out in a one-dimensional manner, they may be laid out in a two-dimensional manner.

In addition, it should be noted that although in the above embodiments, the switch selection detectors 12, 12' are of a photoelectric type including the infrared LEDs 19 and the phototransistors 20, it is not intended to limit this invention thereto and they may be of other types such as an electrostatic capacity type in which an electrode is provided on a surface of a manipulative switch, which is to be contacted by fingers of the driver, for detecting a contact thereto by a driver's finger through a change in the electrostatic capacity of a capacitor connected to the electrode.

What is claimed is:

1. A switch system for an automotive vehicle comprising:
    a plurality of switches disposed in a predetermined spatial orientation for operating various devices mounted on the vehicle;
    a switch selection detector for detecting which one of said switches is selected by a driver;
    display means for displaying the result of a driver's switch selection detected by said switch selection detector as well as the operating conditions of the devices as a result of the driver's switch selection; and
    a reflector, provided at a location above a dash board, for reflecting the contents of said display means, said reflector providing the displayed contents of said display means to the driver along a display viewing sight line, which is oriented substantially in a same direction as, but below, a driver forward sight line,
    wherein the reflected contents representative of the results of the driver's manipulations of said switches are provided at locations corresponding to the spatial orientation of said switches.

2. A switch system according to claim 1, wherein said reflector comprises a half mirror positioned below said forward sight line.

3. A switch system according to claim 1, wherein said reflector comprises a front windshield having a lower portion, said lower portion reflecting the contents of the display means along said display viewing sight line.

4. A switch system according to claim 1, wherein said switches and said switch selection detector are mounted on a steering wheel in a facing relation to the driver.

5. A switch system according to claim 1, wherein said switches and said switch selection detector are mounted on said devices.

6. A switch system according to claim 1, wherein each of said switches includes an infrared LED and phototransistor pair, which are disposed on opposite sides of a corresponding switch, each of said infrared LEDs emitting a ray, that is detected by a corresponding phototransistor, said LED and phototransistor pairs detecting an interruption in a corresponding emitted ray when a user selects a corresponding switch.

7. A switch system for an automotive vehicle comprising:
    a plurality of switches disposed in a predetermined spatial orientation for operating various devices mounted on the vehicle;
    a switch selection detector for detecting which one of said switches is selected by a driver; and
    display means for displaying the result of a driver's switch selected detected by said switch selection detector as well as the operating conditions of the devices as a result of the driver's switch selection, said display means being provided at a location above a dash board and below the driver's sight line through a front windshield so as not to reduce the driver's field of forward view through the windshield so that the driver can watch the displayed contents of said display means while watching the road ahead;
    wherein contents of the display representative of the results of the driver's manipulations of said switches are provided at locations corresponding to the spatial orientation of said switches.

8. A switch system according to claim 7, wherein said switches and said switch selection detector are mounted on a steering wheel in a facing relation to the driver.

9. A switch system according to claim 7, wherein said switches and said switch selection detector are mounted on said devices.

10. A switch system according to claim 7, wherein each of said switches includes an infrared LED and phototransistor pair, which are disposed on opposite sides of a corresponding switch, each of said infrared LEDs emitting a ray, that is detected by a corresponding phototransistor, said LED an phototransistor pairs detecting and interruption in a corresponding emitted ray when a user selects a corresponding switch.

* * * * *